Patented Sept. 21, 1926.

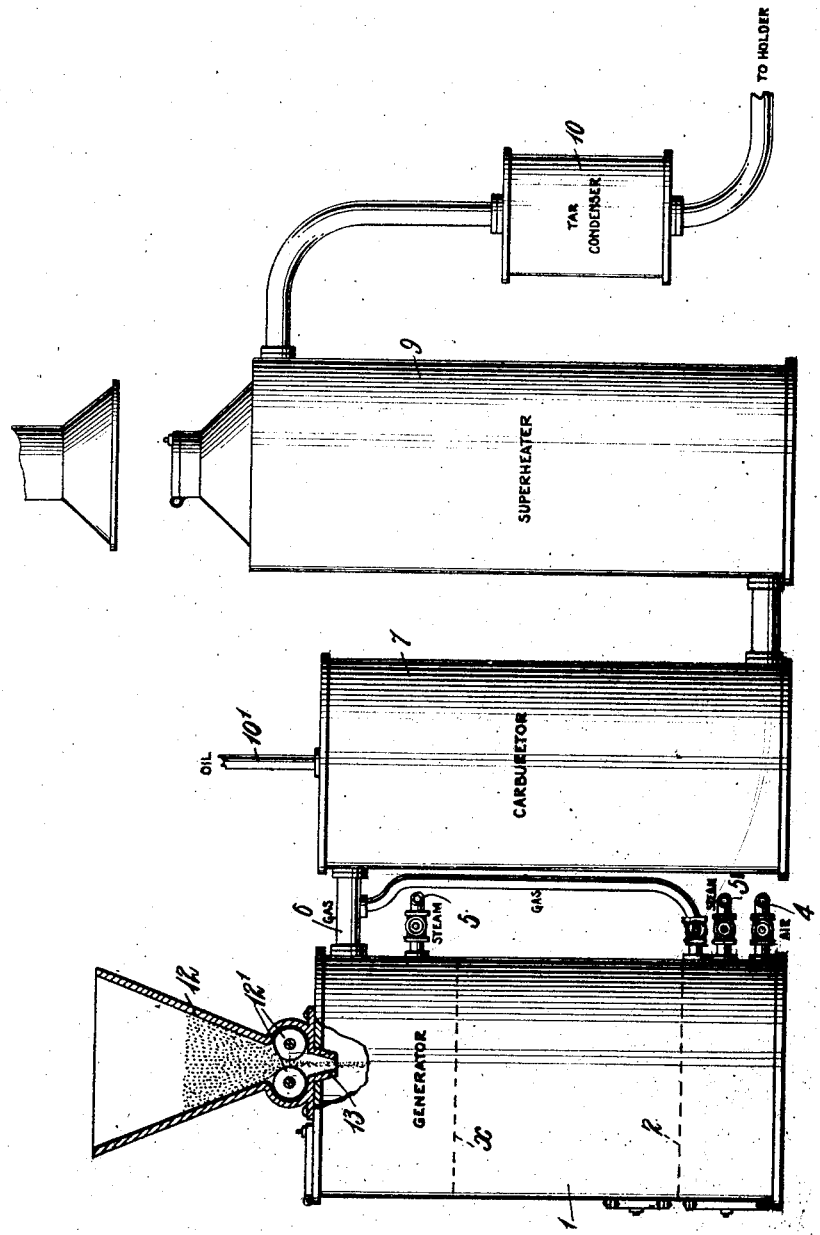

1,600,375

UNITED STATES PATENT OFFICE.

WALTER EDWIN TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

PROCESS OF PRODUCING ENRICHED WATER GAS.

Application filed June 21, 1921. Serial No. 479,203.

The invention relates to a process of producing enriched water gas.

In the prior art of manufacturing water gas, the generator is generally charged with a large amount of lump coal or coke which is subjected to alternate blowing and gas making operations until the coal charge is largely consumed, whereupon gas making and blowing operations are discontinued until a fresh charge of fuel is supplied. Gas generators have also been charged with comparatively small quantities of lump coal or coke at more frequent intervals and during gas making periods. These processes, however, have objectionable features, in that where bituminous coals in these charges are used, a material portion of the volatile content of the coal is consumed during the blowing operation.

The present invention comprises a process for producing materially increased amounts of water gas in standard water gas sets, as well as enriching the gas with the volatile content of the coal, thereby dispensing with or materially reducing the quantity of hydrocarbon oil necessary for this purpose.

It is an object of this invention to introduce fuel to the generator during the gas making period and to have the fuel in such a fine state of division that its volatile content is vaporized or gasified during the gas making period. I use at times finely divided coal preferably with an appreciable volatile content, and at other times an amalgam consisting of finely divided coal, oil, and a small amount of water, such as is produced in the manner disclosed in my Patent No. 1,420,165. When amalgam is used, it is fed slowly into the generator in thin streams or ribbons, or in any manner that exposes the greatest possible surface to the heat, so that the volatile contents will be driven off during the gas making period.

The volatile content of coal makes a richer gas than the fixed carbon with the steam. That is one reason for getting all the volatile matter into the gas instead of having a large part of same consumed in blowing the generator up to a generating temperature. The volatile or hydrocarbon content of the coal therefore enriches the gas and either eliminates the use of oil for enriching, or curtails the amount ordinarily necessary.

It is pointed out that when oil must be used it is preferably introduced to the generator with the finely divided coal as an amalgam, instead of in a separate carburetting chamber. When, as in all present practice, the oil is introduced into a separate carburetting chamber, a specially prepared and high priced oil must be used in order to prevent excessive carbon deposits in the checkerwork of the carbureter, but when the oil is introduced with the coal to the generator, cheaper oils can be used because any free carbon resulting from the cracking of the oil is deposited into and becomes a part of the carbon mass and with it is either converted to blue water gas or consumed in blowing up the tempearture of the generator.

The carbureter of the usual gas making plant can ordinarily be dispensed with when operating with a fuel consisting of the amalgam, but in following my process I have found that the standard water gas plant including the carbureter may be used, in which event the carbureter is employed for raising the temperature of the vapors discharged from the generator to convert them into fixed gases, the carbureter in that case being in effect an auxiliary superheater. If, however, further enrichment is necessary, this can be accomplished by introducing oil to the carbureter.

In the accompanying drawings I have disclosed a diagrammatic illustration of one of the standard water gas making sets, which is capable of supporting the present process, although it will be understood that various types of apparatus may be employed.

In the drawings, the figure represents an elevation of an apparatus used for carrying out the process.

Referring now more particularly to the drawings, wherein like reference characters indicate corresponding parts, the numeral 1 designates a generator which may be of the standard construction having a suitable grate 2 therein constituting a support for the fuel introduced to the retort. In my process comminuted coal, coke, or the like, may be used as a fuel, or an amalgam consisting of a mixture of finely comminuted coal, hydrocarbon oil and a small percentage of water, the amalgam being of a consistency resembling mortar. The coal used as a fuel may first have undergone a cleaning treatment in a manner disclosed in my Patent No. 1,420,165, for the purpose of removing a large portion of the natural ash leaving a more pure carbonaceous product for the production of gas.

When the gas plant is placed in operation a supply of fuel is introduced to the retort, preferably filling the same to the level indicated by the reference character X. This mass of fuel is brought to the proper temperature for gas making by introducing air to the generator through the pipe 4, causing the fuel to be heated to an incandescent state. The air run is discontinued, and then a down run of steam through the pipe 5 preferably takes place. This steam passes through the body of incandescent fuel, is decomposed and forms water gas. By first having a down run of steam through the generator, if finely divided fuel is used, the residue is placed in the form of coke and united with the fuel bed while the volatiles are carried through the fuel bed and then discharged. When the fine particles are incorporated with the fuel bed, then they will not be disturbed or blown away by a succeeding up run of steam. When an amalgam is used the same usually contains an appreciable percentage of water and by first resorting to a down run of steam, steam is generated from this water, the same being carried through an incandescent fuel bed and decomposed before its discharge. After a down run of steam the supply through the pipe 5 is cut off and an up run of steam through the pipe 5' takes place. This steam of course is decomposed, forming water gas and then discharged through the pipe 6 to a carburetor, or auxiliary superheater 7, where it may be carburetted if desirable, or merely passed through the carburetor for the purpose of completing the conversion of the products from the generator into fixed gases, in which event the carburetor in effect acts as a superheater. After the passage of the gases through the carburetor the same then pass into a superheater 9 and thence to a washing or scrubbing apparatus 10, and finally to a holder.

During each gas making period there is introduced to the generator a small supply of finely divided fuel, which may be pulverized coal, or an amalgam of coal, oil and a small percentage of water. Fuel is placed within the feed hopper 12 having arranged therein pressure feeding elements 12' adapted to force the fuel through the narrow feeding nozzles 13 in thin and narrow streams into the generator over the fuel bed. The fuel thus fed, contains exceedingly fine coal particles so that the heat can very quickly and thoroughly penetrate them in a single gas making period, thereby vaporizing the hydrocarbon content of the fuel which is collected with the water gas, materially enriching the water gas produced in the generator. The gases produced in the generator comprising both the vaporized volatiles of the small charge of fuel that is fed to the generator during each gas making period and the water gas produced therein, pass through the discharge pipe 6 into the carburetor or auxiliary superheater 7 with the water gas, thence to the superheater 9, to the scrubber 10 and are finally collected in a holder. When the introduced fuel consists of the amalgam of finely divided coal, this amalgam contains approximately 40 pounds of oil to 100 pounds of coal and the hydrocarbon content of this oil and of the coal when vaporized materially enriches the water gas, thereby eliminating the use of oil in the carburetor, or curtailing the amount ordinarily necessary. In the prior art, when water gas plants where oil is introduced in the carbureting chamber are used, specially prepared oil must be used for the purpose of preventing excessive deposits of carbon in the checkerwork of the carburetor. By my process of introducing the oil with the fuel directly to the generator, inexpensive grades of oil can be used, as any free carbon resulting from the cracking of the oil is deposited into and becomes a part of the carbon fuel bed. If the gas produced is not sufficiently rich for certain purposes, then an additional supply of oil can be introduced into the carburetor in the usual manner for further enriching the gas by conveying gas oil to the carburetor through the pipe 10'. After a gas making period has been completed by the steam blow through the steam feeding pipes 5 and 5', then this steam supply is cut off, and an air run through the fuel bed takes place by admitting air under pressure to the generator through said air feeding pipe 4, raising the temperature of the fuel for a succeeding gas making period or steam run. These alternate blow and gas making periods of course continue successively throughout the operation of the plant.

Each gas making period is of course so short that the coal particles introduced to the generator during each period must be exceedingly fine in order that the heat can penetrate them very quickly. These periods are too short to allow heat penetration and the discharge of the volatiles from lump fuel as practiced in the prior art. When oil is used with the coal in the form of amalgam, this oil is thoroughly filmed over the particles of coal and susceptible of rapid volatilization.

In practicing the invention I preferably use coal of a 100 mesh or finer to a square inch, and the amount of coal admitted during each charge depends of course upon the size of the plant in operation. The charges, however, are limited to such quantities as can be thoroughly penetrated by the heat during the gas making period of their introduction, driving off the volatiles which are collected with the water gas and these volatiles are therefore absent from the field of combustion during the succeeding air blow. After each gas making period, a run of air takes place, blowing up the temperature of the fuel in the generator, but inasmuch as the small charge of fuel deposited in the generator preceding the air run has been robbed of its volatiles which have been discharged with the water gas and the residue is converted into fixed carbon or coke, which becomes a part of the solid fuel mass, no material quantity of the volatiles of the introduced fuel are consumed, but instead they have gone to the gas holder with the water gas enriched thereby.

The amalgam also may contain an appreciable quantity of water, and in this event the water is decomposed when the amalgam is subjected to heat in the generator so that smaller quantities of steam need be admitted to the steam feeding pipes, which facilitates the production of the water gas. The amalgam can be made to contain various percentages of water or moisture, and I have successfully employed an amalgam containing water ranging from 5 to 50 percent of the amalgam content. Even with this maximum quantity of water, the amalgam will remain in a somewhat plastic condition.

As heretofore stated, I may employ as a fuel, the carbonaceous content of coal which has been largely freed of its natural ash, which carbonaceous material may be used in a comminuted form or mixed with oil as an amalgam. Fuel of this kind is manifestly very desirable as it permits low grade coal to be employed for gas making and eliminates the objectionable deposits of clinker in the generator also reducing the ash residue to a minimum.

By the terms "air blow periods" and "gas making periods," as used in the specification and the claims, it is meant that these periods consist of the usual alternate air and steam runs respectively which are now universally employed in the manufacture of water gas.

By the word "amalgam" as used in the specification and claims is meant a substance consisting of the finely divided carbonaceous particles, oil and a small percentage of water which are united in a somewhat plastic mass of a consistency resembling that of mortar.

Having thus described the invention, what I claim is:

1. The process of producing enriched water gas, consisting in alternately passing streams of air and steam through a bed of ignited carbonaceous fuel in a generator during a plurality of successive blow and gas making periods, in decomposing the steam during its passage through the fuel bed during each gas making period, in introducing to said generator during each gas making period a small quantity of a composite carbonaceous fuel consisting of oil and comminuted carbon in a substantially ribbon like form from which fuel volatiles are vaporized and mixed with the passing water gas while the carbonaceous residue deposits on the fuel bed before a succeeding air blow at which time the temperature of said bed is raised, and in collecting the enriched water gas thus produced.

2. The process of producing enriched water gas, consisting in alternately passing streams of air and steam through a bed of ignited carbonaceous fuel in a generator during a plurality of successive blow and gas making periods, in decomposing the steam during its passage through the fuel bed in gas making periods, in introducing to the generator during each gas making period a fuel of a plastic consistency and in a ribbon like form and containing oil, comminuted coal and water, the volatiles of which are vaporized and mixed with the water gas while the residue collects on the bed of fuel in the generator as carbon before a succeeding blow period, and in collecting the enriched gases from said generator.

In testimony whereof I affix my signature.

WALTER EDWIN TRENT.